United States Patent
Paulsen et al.

(10) Patent No.: US 6,866,211 B2
(45) Date of Patent: Mar. 15, 2005

(54) LATERAL SPRAY NOZZLE

(75) Inventors: Gary Paulsen, Batavia, IL (US); Bart R. Bolman, Streamwood, IL (US); Patrick M. Maney, Batavia, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 10/677,448

(22) Filed: Oct. 2, 2003

(65) Prior Publication Data

US 2004/0124290 A1 Jul. 1, 2004

Related U.S. Application Data

(60) Provisional application No. 60/415,409, filed on Oct. 2, 2002.

(51) Int. Cl.[7] ................................................. B05B 1/00
(52) U.S. Cl. ....................... 239/597; 239/566; 239/568; 239/589; 239/592; 239/598; 239/601
(58) Field of Search ................................ 239/566, 568, 239/589, 592, 559, 597, 598, 599, 601

(56) References Cited

U.S. PATENT DOCUMENTS

| | | | | |
|---|---|---|---|---|
| 2,090,284 A | * | 8/1937 | Carlson | 239/597 |
| 2,778,687 A | * | 1/1957 | Hegstad | 239/601 |
| 2,964,248 A | * | 12/1960 | O'Brien et al. | 239/601 |
| 3,563,474 A | * | 2/1971 | Robinson | 239/566 |
| 3,584,786 A | * | 6/1971 | Johnson | 239/601 |
| 3,737,108 A | * | 6/1973 | Stumphauzer et al. | 239/601 |
| 4,346,848 A | * | 8/1982 | Malcolm | 239/601 |
| 5,076,497 A | * | 12/1991 | Rabitsch | 239/601 |

* cited by examiner

Primary Examiner—Robin O. Evans
(74) Attorney, Agent, or Firm—Leydig, Voit & Mayer, Ltd (57) ABSTRACT

A spray nozzle for directing a wide lateral spray curtain with substantially uniform liquid distribution throughout the length of the spray curtain is provided. The nozzle includes a nozzle body defining an elongated internal flow passage. The nozzle body includes an inlet end for connection to a pressurized liquid supply, a downstream end wall and a side wall. A discharge orifice is provided in the side wall of the nozzle body between the inlet end and the downstream end wall. The discharge orifice communicates with the internal flow passage of the nozzle body. The discharge orifice has a generally inverted teardrop configuration comprising a relatively larger area upper portion and a relatively smaller area lower portion arranged below the upper portion.

34 Claims, 5 Drawing Sheets

_Fig. 14._

_Fig. 15._

LATERAL SPRAY NOZZLE

FIELD OF THE INVENTION

The present invention relates generally to liquid spray nozzles, and more particularly, to spray nozzle assemblies adapted for directing a flat spray pattern in a wide lateral direction.

BACKGROUND OF THE INVENTION

It is known to mount a plurality of spray nozzle assemblies along a liquid supply boom, up to twenty feet or more in length, which is pulled by a tractor or is part of a self-contained vehicle, with the discharging spray patterns of the nozzles in partially overlapping relation to each other to create a wide spray curtain. To achieve substantially uniform liquid distribution throughout the spray curtain, it is necessary that the spray nozzles be mounted on the spray boom at such intervals that the discharging sprays overlap in a determined fashion. Excessive spacing between the spray nozzles can result in insufficient liquid distribution between adjacent discharging sprays, and too close of nozzle spacing can result in excessive liquid distribution in the overlapping spray patterns. Because of the necessity for using a multiplicity of spray nozzles, boom mounted spraying systems are expensive. Booms also can be cumbersome to pull and manipulate during spraying.

Additionally, many applications exist where boom spraying is impractical or ineffective. For example, rugged terrain or other obstacles or impediments can restrict boom lengths. This reduces the cost effectiveness of boom spraying in these applications. If such obstacles or impediments are severe enough, manual spraying using handheld spray guns, which is both inaccurate and costly, could be required.

While proposals have been made for using a single spray nozzle to direct a relatively wide spray pattern in order to eliminate the necessity for a multiplicity of spray nozzles and the long supporting boom, such prior proposals have been relatively expensive and have not been effective for discharging sprays with uniform liquid distribution.

OBJECTS AND SUMMARY OF THE INVENTION

It is an object of the present invention to provide a spray nozzle which can be used in place of a plurality of boom mounted spray nozzles for producing a relatively wide flat spray curtain with substantially uniform liquid distribution.

A further object of the present invention is to provide a spray nozzle as characterized above which makes mechanized spraying practical and effective.

Another object is to provide a spray nozzle as characterized above which is relatively simple in construction and which lends itself to economical manufacture.

Other objects and advantages of the invention will become apparent upon reading the following detailed description and upon reference to the drawings, in which:

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Figure 1:
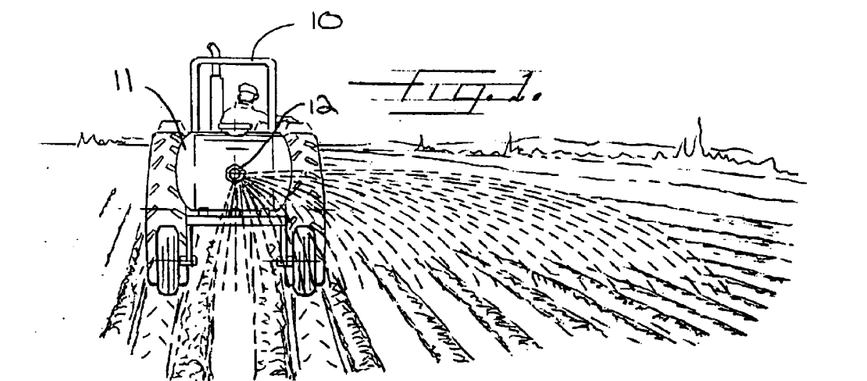
FIG. 1 is a rear elevation view of a liquid spraying system having a spray nozzle in accordance with the invention for discharging a spray pattern behind and laterally to one side of an illustrative vehicle upon which the spraying system is mounted.

Referring now more particularly to FIG. 1 of the drawings, there is shown a vehicle 10 having a liquid spraying system that includes a liquid supply tank 11 and a spray nozzle 12 in accordance with the invention supported on a supply pipe connected to the tank in horizontal rearwardly extending relation to the tractor 10 for directing a spray behind and laterally to the side of the tractor 10. Such spray arrangement, for example, has utility in spraying chemicals for weed control along the side of a road. Alternatively, a pair of nozzles in accordance with the invention can be mounted in parallel relation, either side-by-side or one above the other, for directing discharging sprays in opposite lateral directions. It will be understood that the spray nozzle of the present invention eliminates the need for relatively expensive and cumbersome to manipulate spray booms commonly used in agricultural and roadside spraying, and allows spraying of areas that are impractical to spray with booms.

Figures 2, 2A, 3:
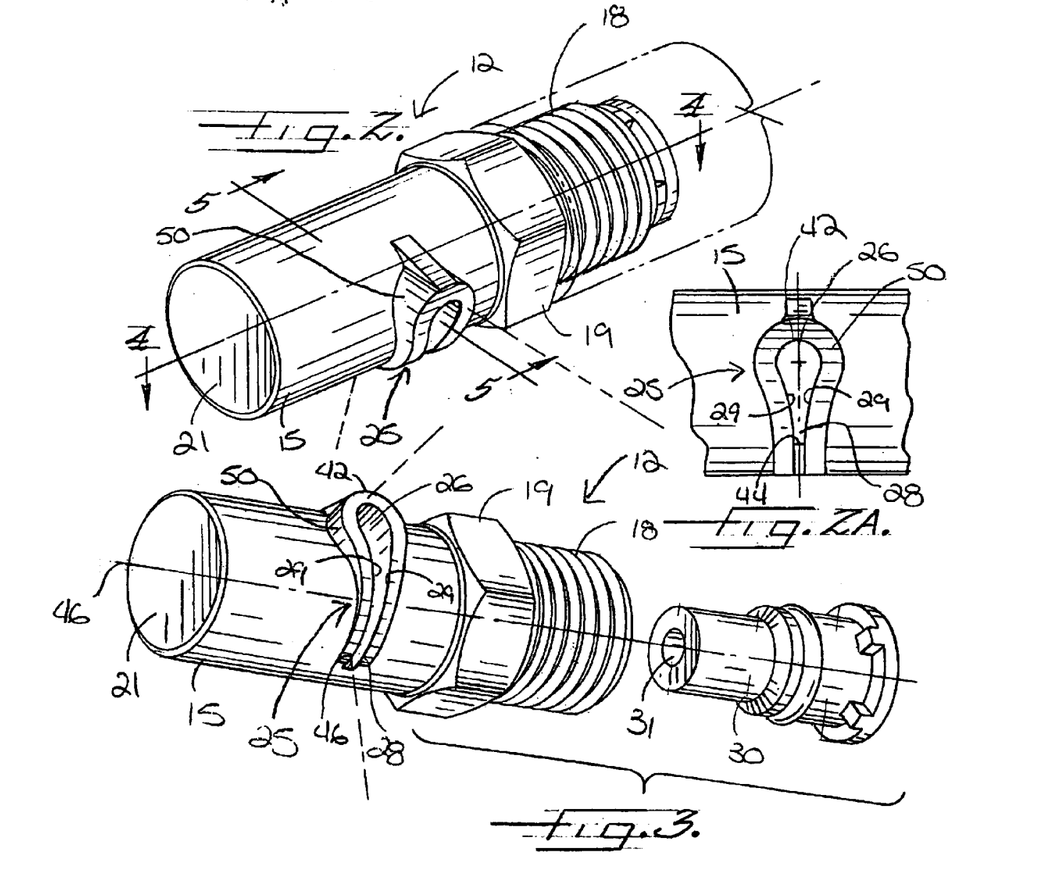
FIG. 2 is a perspective view of the spray nozzle used in the spraying system shown in FIG. 1.
FIG. 2A is an enlarged partial side elevation view of the spray nozzle of FIG. 2 showing the discharge orifice of the nozzle.
FIG. 3 is an exploded perspective view of the spray nozzle of FIG. 2 showing the pre-orifice member of the nozzle.
Figures 4, 5, 6, 7:
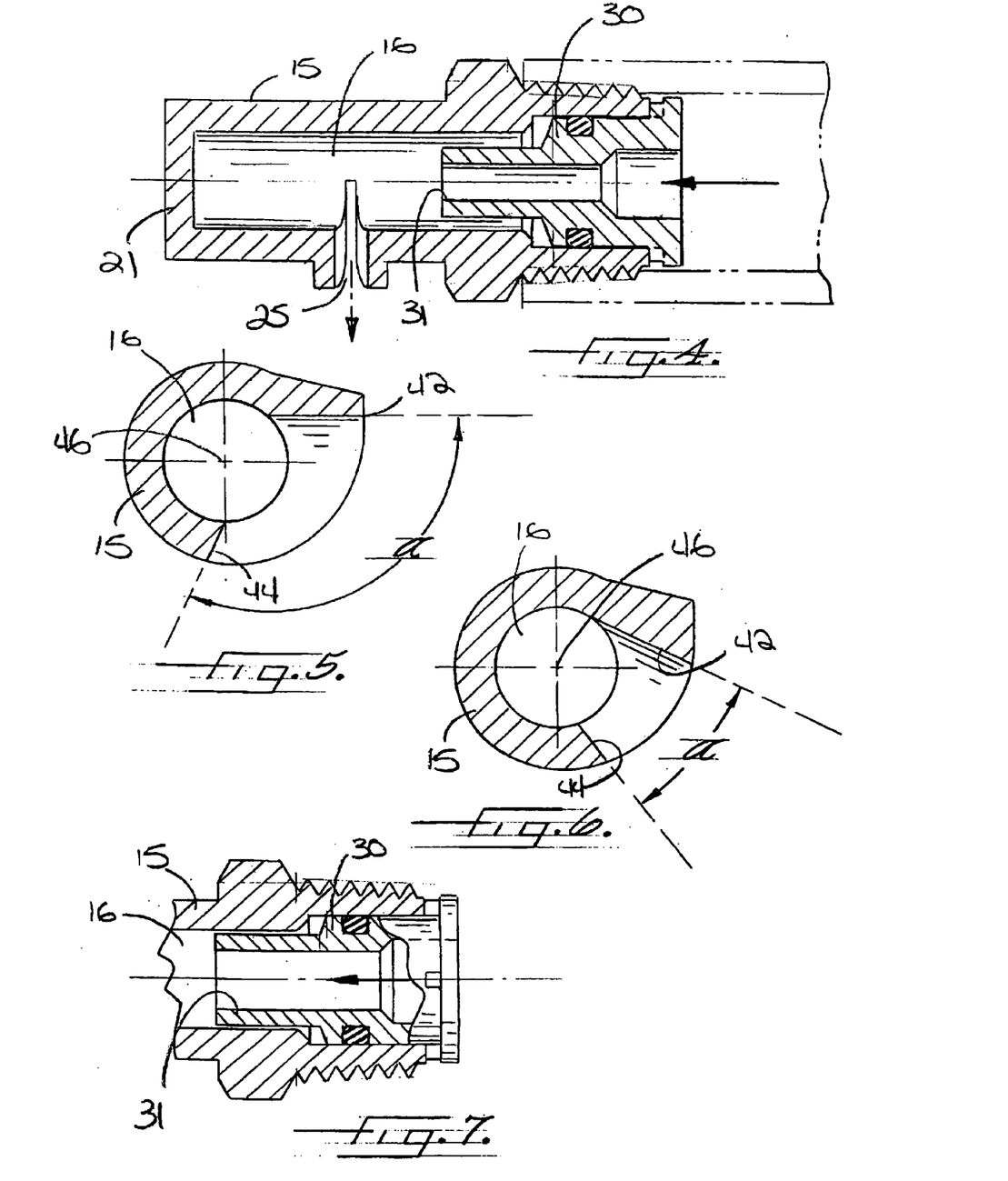
FIG. 4 is a side sectional view of the spray nozzle of FIG. 2 taken in the plane of the line 4—4 in FIG. 2.
FIG. 5 is an end sectional view of the spray nozzle of FIG. 2 taken in the plane of the line 5—5 in FIG. 2.
FIG. 6 is an end sectional view similar to FIG. 5 of an alternative embodiment of a spray nozzle according to the present invention.
FIG. 7 is a partial side sectional view of the spray nozzle of FIG. 2 showing the pre-orifice member.

As shown in FIGS. 2–4, the spray nozzle 12 in this case has a body 15 which defines an elongated internal flow passage 16, which preferably is generally cylindrical, communicating at its upstream end with a liquid supply such as a liquid supply pipe or line. In the illustrated embodiment, the body includes an hexagonal annular mounting flange 19 and a threaded connecting portion 18 at an upstream end that facilitate connection of the spray nozzle 12 to the supply pipe via a standard threaded connection. However, as will be appreciated, any suitable method can be used to attach the 
spray nozzle 12 to the supply pipe or other supply line. The nozzle body 15 in this instance has a closed downstream end 21 and is intended to be supported in horizontally extending relation to the liquid supply pipe.

In accordance with an important aspect of the invention, the spray nozzle 12 has an irregular configured discharge orifice 25 communicating with the internal flow passage 16 for directing a relatively wide lateral liquid spray curtain with substantially uniform liquid distribution throughout the length of the liquid spray pattern. The size of the spray pattern can vary depending on what is needed for a particular application with spray patterns that are over twenty feet wide being achievable. Another advantage of the irregularly configured discharge orifice is that it minimizes the generation of fine fluid particles that are subject to undesirable drift. Such drift can result in wasted spray or even harm to adjacent areas when weed control chemicals or the like are being sprayed. While the theory of operation is not entirely understood, the spray nozzle according to the invention creates a flow condition within the nozzle chamber that results in controlled turbulence, and the discharge of relatively uniform, large spray particles.

To this end, the illustrated nozzle 12 has a discharge orifice 25 communicating through a side of the body 15 intermediate its upstream and downstream ends which includes a relatively large upper orifice portion 26 for directing relative large quantities of liquid in a substantially horizontal direction a relatively long distance outwardly of the spray nozzle 12. The discharge orifice 25 also includes a relatively smaller area orifice portion 28 disposed below the larger area portion 26 for directing relatively smaller quantities of liquid downwardly and outwardly of the nozzle 12 a shorter distance from the spray nozzle. In addition to directing fluid outward, the smaller area orifice portion 28 can be configured to direct fluid beneath the nozzle 12 and even in the opposite lateral direction to the discharge produced by the relatively large upper portion 26 of the discharge orifice.

In the embodiment illustrated in FIGS. 2–4, the discharge orifice 25 has an inverted teardrop configuration which includes an enlarged generally cylindrical upper orifice portion 26 extending radially through the nozzle body 15 and a smaller, narrow slot-like lower orifice portion 28 extending downwardly, i.e., vertically, through the nozzle body 15. The lower portion 28 communicates with the upper portion 26 through upwardly and outwardly curved sidewalls 29. As shown in FIG. 5, the upper orifice portion 26 in this case is oriented such that the uppermost edge 42 of the upper orifice portion 26 is positioned at a vertical level that is near or above the centerline 46 of the nozzle body 15, and the lower edge 44 of the lower portion 28 extends to the bottom of the cylindrical body 15. It has been unexpectedly found that a nozzle with such a discharge orifice configuration is effective for directing a relatively wide lateral spray pattern with substantially uniform liquid distribution along the entire spray pattern.

In the embodiment illustrated in FIGS. 2–4, the discharge orifice 25 is configured such that the angle a (see FIG. 5) between the lower edge 44 of the discharge orifice and the upper edge 42 of the discharge orifice is quite large, in this case greater than 90°, so that the nozzle 12 can direct spray of significant distances, e.g., twenty feet or more. Alternatively, the upper and lower edges 42, 44 of the discharge orifice 25 can be brought closer together for shorter distance lateral spraying. For example, as shown in FIG. 6, the lower edge 44 of the orifice 25 can be moved upward past the bottom of the nozzle body 15 and the upper edge 42 of the orifice can be moved down to near the vertical level of the centerline 46 of the nozzle body 15 so as to produce a slightly angled down configuration that forms an angle a smaller than the angle shown in FIG. 5. The result is that spray is discharged laterally a relatively shorter distance (as compared to the FIG. 5 arrangement) and spray is not directed underneath the nozzle 12.

In carrying out the invention, for enhancing liquid particle breakdown and substantially uniform liquid distribution, the spray nozzle 12 has a pre-orifice member 30, which defines a pre-orifice 31 substantially smaller in diameter than the diameter of the liquid flow passage 16 for accelerating the liquid flow stream as it is introduced into the spray nozzle flow passage 16 as best shown in FIGS. 3 and 4. The pre-orifice member 30 in this case is in the form of an insert in the upstream end of the nozzle body 15. The pre-orifice member 30 preferably defines a pre-orifice 31 having a diameter less than one-half of the diameter of the liquid passage 16. It has been found that such an arrangement helps limit the creation of fine or small droplets that would be subject to undesirable drift. However, pre-orifice members 30 that define substantially larger pre-orifices 31 could be used such as shown in FIG. 7.

To help optimize the spray pattern, the nozzle 12 can be formed with an external hood 50 arranged in surrounding relation to the discharge orifice 25. This hood 50 helps direct the fluid as it is discharged from the nozzle 12 helping to form the fluid into a more precise spray pattern. As best shown in FIGS. 2A and 3, the external hood 50 in the case of the illustrated embodiment comprises a wall extending outward from the outer surface of the nozzle body 15 that extends along the sides of the lower smaller orifice portion 28 and completely around the perimeter of the upper larger orifice portion 26. In this instance, the height of the external hood 50 varies with the hood getting higher or taller as it extends from its lower end to its upper end which surrounds the upper larger orifice portion 26 of the discharge orifice 25.

As will be appreciated, the size and arrangement of the various parts or portions of the nozzle 12 relative to each other can be varied in order to produce the desired spray characteristics. In this regard, in one preferred embodiment, the diameter of the pre-orifice 31 is approximately equal to the diameter of the upper, relatively larger area orifice portion 26 of the discharge orifice 25 and equal to approximately three times the width of the lower, relatively smaller portion 28 of the discharge orifice. Additionally, in one preferred embodiment, the center of the discharge orifice 25 is located a distance from the pre-orifice 31 that is approximately one to two times the diameter of the pre-orifice. In one preferred embodiment, the closed downstream end 21 of the nozzle body 12 is located a distance from the pre-orifice 31 that is approximately three times the diameter of the pre-orifice. Additionally, in one preferred embodiment, the external hood 50 at its highest point extends outward approximately one to two times the wall thickness of the nozzle body 12. Those skilled in the art will appreciate that arrangements other than those specifically mentioned are also possible.

In operation, pressurized liquid through the supply line from the tank is accelerated as it is introduced through the relatively small diameter pre-orifice 31 into the larger diameter liquid passage 16 where it impinges upon the end wall 21 and other liquid within the passage 16 and is directed laterally outwardly through the discharge orifice 25. Greater quantities of liquid are directed from the upper orifice portion 26 upwardly and outwardly a relatively long distance, while smaller quantities are directed to the smaller lower orifice portion 28 downwardly and outwardly of the nozzle over a shorter length. Unexpectedly, as indicated above, by reason of the unique orifice configuration, relatively uniform liquid distribution can be achieved throughout the relatively long curtain-like spray pattern.

Figure 8:
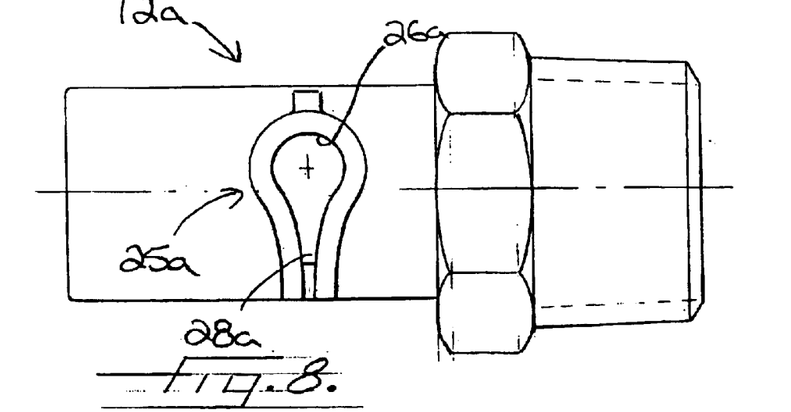
FIGS. 8–12 are side elevation views of spray nozzles, generally similar to that depicted in FIG. 2, but with different configurations of liquid discharge orifices in accordance with the invention.
Figure 9:
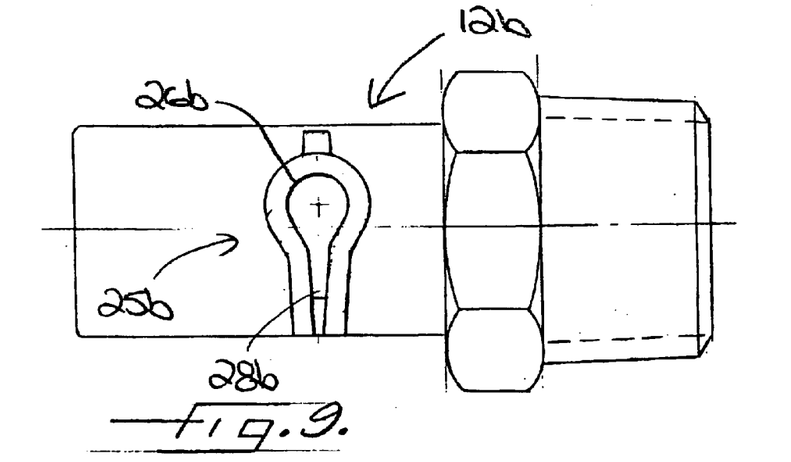
Figure 10:
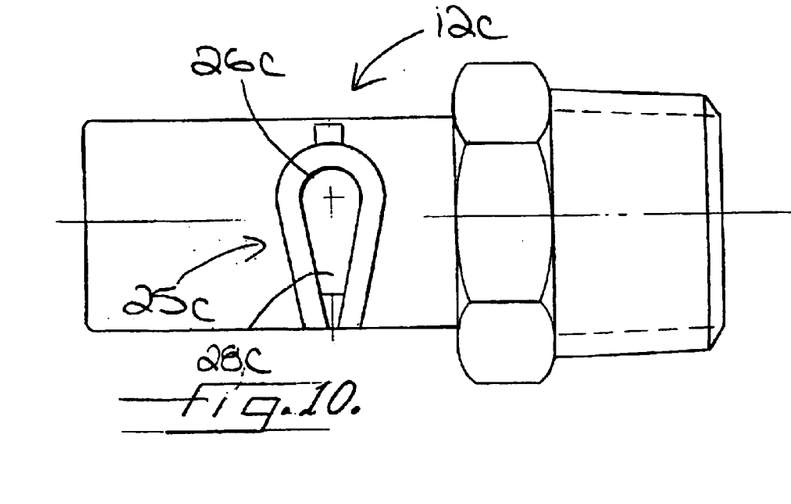
Figure 11:
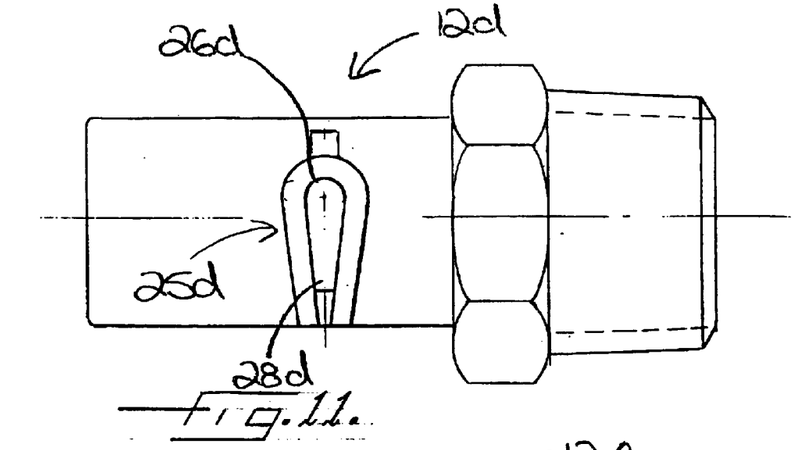
Figure 12:
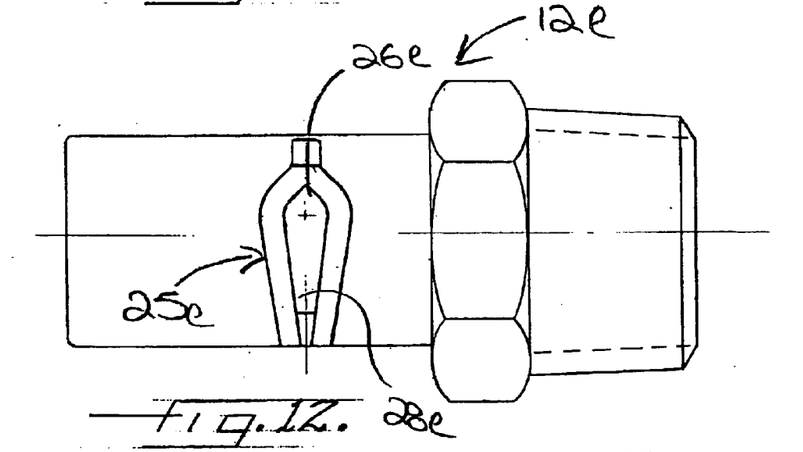

It will be understood by one skilled in the art that the discharge orifice 25 may be designed for particular spray applications and variations in the spray distribution. With reference to FIGS. 8–12, spray nozzles, similar to the spray nozzle 12 disclosed above, are shown with alternative configurations of generally inverted teardrop shaped discharge orifices, wherein items similar to those described above have been given similar reference numerals with a distinguishing letter suffix added. With reference to FIG. 8, the spray nozzle 12a has a discharge orifice 25a with a slightly larger diameter upper portion 26a which communicates with a slightly smaller width lower portion 28a. With reference to FIG. 9, the spray nozzle 12b has an inverted teardrop-shaped discharge orifice 25b with substantially straight sides 29b that interconnect the upper and lower orifice portions 26b, 28b. With reference to FIG. 10, the spray nozzle 12c has a discharge orifice 25c in which the lower orifice portion 28c is defined by substantially straight sidewalls which communicate directly with the upper cylindrical portion 26c. A substantially similar design is shown in FIG. 11, wherein the upper orifice portion 26d is smaller in diameter. FIG. 12 discloses a discharge orifice similar to FIG. 10, in which the upper portion 26e is defined by a pair of upwardly angled walls which define an acute angle.

Figure 13:
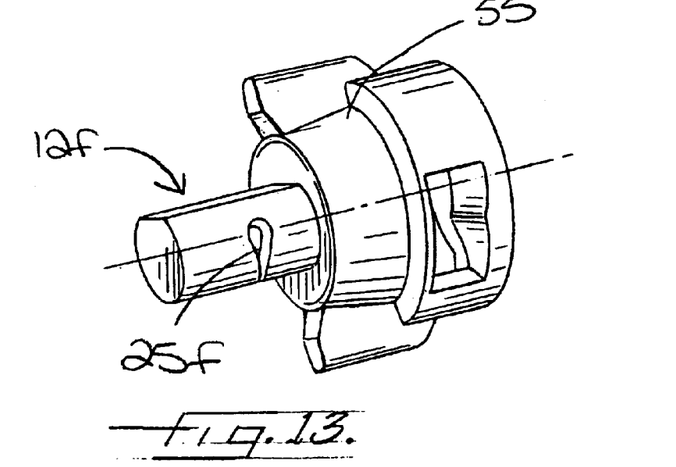
FIG. 13 is a perspective view of a spray nozzle assembly having an upstream end configured for quick disconnect mounting on a nozzle body or feed pipe.

With reference to FIG. 13, a spray nozzle is shown having a nozzle 12f with an inverted teardrop-shaped discharge orifice 25f similar to that shown above and an integrally formed upstream quick disconnect mounting end 55 which can be used with conventional quick disconnect nozzle bodies.

Figure 14:
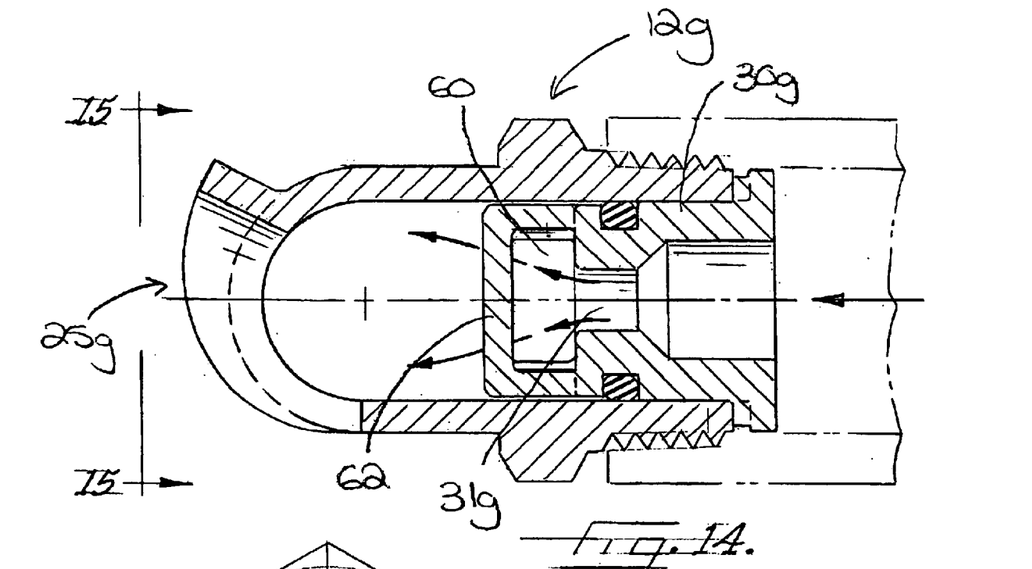
FIG. 14 is a longitudinal section of still another embodiment of a spray nozzle in accordance with the invention.
Figure 15:
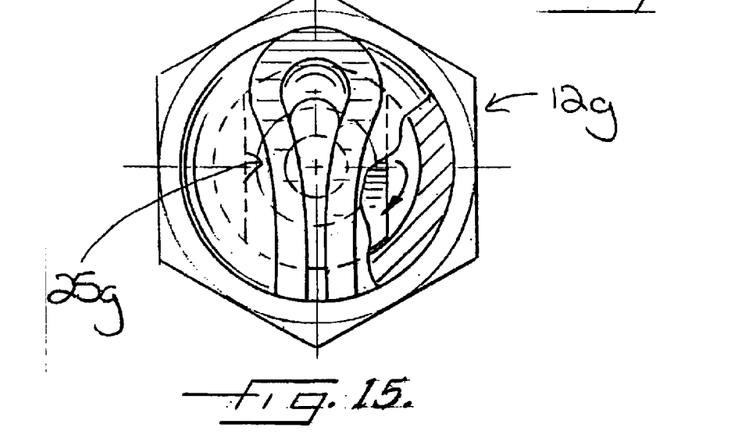
FIG. 15 is an end view of the spray nozzle shown in FIG. 14.

With reference to FIGS. 14 and 15, there is shown an alternative embodiment of spray nozzle 12g in accordance with the invention in which the downstream end has a convex configuration in which a discharge orifice 25g is formed for directing a spray pattern in an axial direction, rather than laterally. The discharge orifice 25g again has an irregular teardrop shape similar to the nozzles shown in FIGS. 1–13 with the upper portion 26g being larger than the lower portion 28g. The embodiment shown in FIGS. 14 and 15 also includes a slightly different pre-orifice member 30g. In particular, the pre-orifice member 30g includes an expansion chamber 60 which is arranged downstream of the pre-orifice 31g. The expansion chamber 60 also defines a wall 62 downstream of the pre-orifice 31g on which the fluid is impinged before it reaches the discharge orifice 25g. This downstream wall 62 helps enhance fluid particle breakdown and includes passages which allow the fluid to move downstream to the discharge orifice.

What is claimed is:

1. A spray nozzle for directing a wide lateral spray curtain with substantially uniform liquid distribution throughout the length of the spray curtain, the nozzle comprising:
    a nozzle body defining an elongated cylindrical internal flow passage and having an inlet end for connection to a pressurized liquid supply, a downstream end wall and a side wall, and
    a discharge orifice in the side wall of the nozzle body arranged between the inlet end and the downstream end wall and communicating with the internal flow passage of the nozzle body, the discharge orifice having an elongated generally inverted teardrop configuration comprising a relatively larger area upper portion and a relatively smaller area lower portion arranged below the upper portion, said discharge orifice having a long axis oriented in a plane perpendicular to a long axis of said elongated internal flow passage.

2. The spray nozzle according to claim 1 further including a hood extending outward from an outside surface of the side wall of the nozzle body and extending around at least a portion of the discharge orifice.

3. The spray nozzle according to claim 2 wherein the hood extends outward a greater distance from the outside surface of the side wall of the nozzle body near an upper edge of the discharge orifice than near the lower edge of the discharge orifice.

4. The spray nozzle according to claim 3 wherein the distane the hood extends outward from the outside surface of the side wall of the nozzle body gradually increases as the hood extends from adjacent a lower edge of the discharge orifice to adjacent an upper edge of the discharge orifice.

5. The spray nozzle according to claim 1 further including a pre-orifice member arranged in the internal flow passage of the nozzle body upstream of the discharge orifice, the pre-orifice member defining a pre-orifice that is relatively smaller area than the cross-sectional area of the internal flow passage and through which fluid passes prior to reaching the discharge orifice.

6. The spray nozzle according to claim 5 wherein the pre-orifice member comprises an insert that is arranged in the internal flow passage of the nozzle body.

7. The spray nozzle according to claim 1 wherein the upper portion of the discharge orifice has a generally cylindrical configuration.

8. The spray nozzle according to claim 7 wherein the lower portion of the discharge orifice has a generally slot-like configuration.

9. The spray nozzle according to claim 8 further including a hood extending outward from an outside surface of the side wall of the nozzle body, the hood extending around the upper portion of the discharge orifice and along a pair of sides of the lower portion of the discharge orifice.

10. The spray nozzle according to claim 8 wherein the upper and lower portions of the discharge orifice are joined by straight side walls.

11. The spray nozzle according to claim 1 wherein the upper portion of the discharge orifice defines an upper edge of the discharge orifice which is above a longitudinal axis of the internal flow passage of the nozzle body.

12. The spray nozzle according to claim 11 wherein the lower portion of the discharge orifice defines a lower edge of the discharge orifice that is adjacent a bottom of the internal flow passage of the nozzle body.

13. The spray nozzle according to claim 1 wherein an upstream end of the nozzle body is configured with quick disconnect coupling.

14. The spray nozzle according to claim 1 wherein an upstream end of the nozzle body is threaded.

15. The spray nozzle according to claim 1 wherein the upper portion of the discharge orifice includes a pair of upwardly angled side walls that define an acute angle.

16. The spray nozzle according to claim 5 wherein the upper portion of the discharge orifice is generally cylindrical and the pre-orifice has a diameter that is approximately equal to the diameter of the upper portion of the discharge orifice.

17. The spray nozzle according to claim 5 wherein the lower portion of the discharge orifice has a generally slot-like configuration and the pre-orifice has a diameter that is approximately three times the width of the lower portion of the discharge orifice.

18. The spray nozzle according to claim 5 wherein the pre-orifice has a diameter and a center of the discharge orifice is located a distance of approximately one to two times the diameter of the pre-orifice from the pre-orifice.

19. The spray nozzle according to claim 5 wherein the pre-orifice has a diameter and the end wall of the nozzle body is located a distance of approximately three times the diameter of the pre-orifice from the pre-orifice.

20. The spray nozzle according to claim 2 wherein the hood at a highest point extends outward from the outside surface of the side wall of the nozzle body approximately one to two time a wall thickness of the nozzle body.

21. A spray nozzle for directing a wide lateral spray curtain with substantially uniform liquid distribution throughout the length of the spray curtain, the nozzle comprising:

a nozzle body defining an elongated internal flow passage and having an inlet end for connection to a pressurized liquid supply, a downstream end wall having a convex configuration and a side wall, and a discharge orifice in the end wall of the nozzle body and communicating with the internal flow passage of the nozzle body, the discharge orifice having an elongated generally inverted teardrop configuration comprising a relatively larger area upper portion and a relatively smaller area lower portion arranged below the upper portion, and said discharge orifice having a long axis oriented in a plane perpendicular to a long axis of said elongated internal flow passage.

22. A spray nozzle for directing a wide lateral spray curtain with substantially uniform liquid distribution throughout the length of the spray curtain, the nozzle comprising:

a nozzle body defining an elongated internal flow passage the nozzle body including an inlet end for connection to a pressurized liquid supply, a downstream end wall and a side wall, and a discharge orifice in the side wall of the nozzle body arranged between the inlet end and the downstream end wall and communicating with the internal flow passage of the nozzle body, the discharge orifice having generally inverted teardrop configuration comprising a relatively larger area upper portion and a relatively smaller area lower portion arranged below the upper portion, said upper portion of said discharge orifice having a generally cylindrical configuration, said lower portion of said discharge orifice having a generally slot-like configuration, and said upper and lower portions of said discharge orifice being joined by curved side walls.

23. A spray nozzle for directing a wide lateral spray curtain with substantially uniform liquid distribution throughout the length of the spray curtain, the nozzle comprising:

a nozzle body defining an elongated internal flow passage the nozzle body including an inlet end for connection to a pressurized liquid supply, a downstream end wall and a side wall, and a discharge orifice in the side wall of the nozzle body arranged between the inlet end and the downstream end wall and communicating with the internal flow passage of the nozzle body, the discharge orifice having generally inverted teardrop configuration comprising a relatively larger area upper portion and a relatively smaller area lower portion arranged below the upper portion, said upper portion of said discharge orifice defining an upper edge of the discharge orifice that angles downwardly.

24. The spray nozzle according to claim 23 wherein the lower portion of the discharge orifice defines a lower edge of the discharge orifice that is above a bottom of the internal flow passage of the nozzle body.

25. A spray nozzle for directing a wide lateral spray curtain with substantially uniform liquid distribution throughout the length of the spray curtain, the nozzle comprising:

a nozzle body defining an elongated generally cylindrical internal flow passage the nozzle body including an inlet end for connection to a pressurized liquid supply, a downstream end wall and a side wall, a discharge orifice in the side wall of the nozzle body arranged between the inlet end and the downstream end wall and communicating with the internal flow passage of the nozzle body, the discharge orifice having generally inverted teardrop configuration comprising a relatively larger area upper portion and a relatively smaller area lower portion arranged below the upper portion, and a pre-orifice member arranged in the internal flow passage of the nozzle body upstream of the discharge orifice, said pre-orifice member defining a pre-orifice having a diameter that is less than one half of the diameter of the internal flow passage.

26. A spray nozzle for directing a wide lateral spray curtain with substantially uniform liquid distribution throughout the length of the spray curtain, the nozzle comprising:

a nozzle body defining an elongated internal flow passage the nozzle body including an inlet end for connection to a pressurized liquid supply, a downstream end wall and a side wall, a discharge orifice in the side wall of the nozzle body arranged between the inlet end and the downstream end wall and communicating with the internal flow passage of the nozzle body, the discharge orifice having generally inverted teardrop configuration comprising a relatively larger area upper portion and a relatively smaller area lower portion arranged below the upper portion, and a hood extending outward by from an outside surface of the nozzle body and around at least a portion of the discharge orifice.

27. A spray nozzle for directing a wide lateral spray curtain with substantially uniform liquid distribution throughout the length of the spray curtain, the nozzle comprising:

a nozzle body defining an elongated internal flow passage the nozzle body including an inlet end for connection to a pressurized liquid supply, a downstream end wall and a side wall, and a discharge orifice in the side wall of the nozzle body arranged between the inlet end and the downstream end wall and communicating with the internal flow passage of the nozzle body, the discharge orifice having generally inverted teardrop configuration comprising a relatively larger area upper portion and a relatively smaller area lower portion arranged below the upper portion, and a pre-orifice member arranged in the internal flow passage of the nozzle body upstream of the discharge orifice, and said pre-orifice member defining a pre-orifice that is relatively smaller in area than the cross-sectional area of the internal flow passage and through which fluid passes prior to reaching the discharge orifice.

28. The spray nozzle according to claim 27 further including an impingement surface supported in the internal passage of the nozzle body downstream of the pre-orifice and upstream of the discharge orifice.

29. A spraying system for directing a wide lateral spray curtain with substantially uniform liquid distribution throughout the length of the spray curtain comprising a motorized tractor for movement along a spraying path, a pressurized supply of liquid to be sprayed carried by said tractor, at least one spray nozzle supported by said tractor, said spray nozzle having a nozzle body defining an elongated internal flow passage and having an inlet end for connection to said liquid supply, and a discharge orifice formed in a wall of said nozzle body communicating with said internal flow passage, said discharge orifice having a generally inverted teardrop configuration comprising a relatively larger area upper portion and a relatively smaller area lower portion arranged below the upper portion for directing liquid outwardly of said tractor during movement along a spraying path.

30. The spraying system of claim 29 in which said nozzle body includes a side wall and an end wall, and said discharge orifice is formed in said end wall.

31. The spraying system of claim 29 including a second spray nozzle identical to said at least one spray nozzle mounted on said tractor for directing a spray curtain in a direction different from the spray curtain directed from said at least one spray nozzle.

32. The spraying system of claim 29 in which said nozzle body includes a side wall and an end wall, and said discharge orifice being formed in said side wall.

33. The spraying system of claim 32 in which said side wall has a cylindrical configuration, and said discharge orifice is located in upstream spaced relation to said end wall.

34. The spraying system of claim 31 which said at least one spray nozzle directs a lateral spray curtain to one side of the spraying path of movement of said tractor, and said second spray nozzle directs a lateral spray curtain to an opposite lateral side to the spraying path of movement of said tractor.

* * * * *